March 22, 1927.
J. L. BROWN
1,621,709
CAP FOR BEARINGS
Filed May 27, 1926
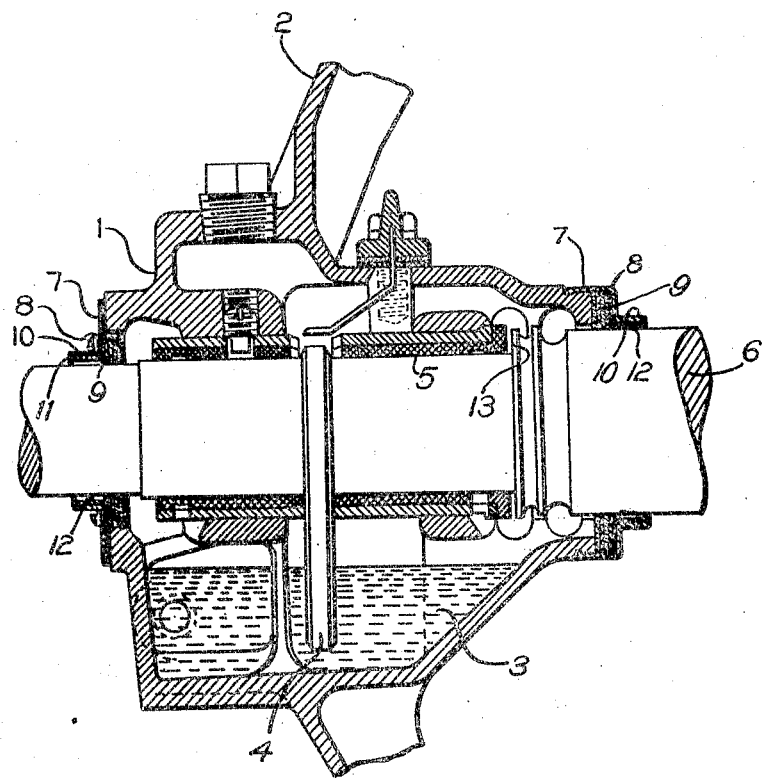
INVENTOR
John L. Brown.

Patented Mar. 22, 1927.

1,621,709

UNITED STATES PATENT OFFICE.

JOHN L. BROWN, OF VERONA, PENNSYLVANIA, ASSIGNOR TO WESTINGHOUSE ELECTRIC & MANUFACTURING COMPANY, A CORPORATION OF PENNSYLVANIA.

CAP FOR BEARINGS.

Application filed May 27, 1926. Serial No. 111,921.

My invention relates to bearings and it has special relation to an oil-lubricated bearing operating in ventilated machines, such as dynamo-electric machines.

The object of my invention is to provide an improved oil wiper and guard for preventing the creepage of oil films and spray along the shaft and over the ends of the bearing housing, in a manner which will be more fully understood with reference to the accompanying drawing, which shows a longitudinal elevational view of a bearing embodying my invention.

Referring to the drawing, my improved bearing is shown as comprising a housing 1 which is carried by the end bracket 2 of an electric motor. The housing comprises an oil receptacle 3 from which oil is supplied, by means of an oil ring 4, to a journal 5 of the motor shaft 6.

My invention is applicable to any type of bearing and hence no further description of the particular type shown need be given. The details of the bearing illustrated in the drawing constitute the subject matter of the specification and claims of a copending application of R. Pruger, Serial No. 668,479, filed October 15, 1923, and assigned to the Westinghouse Electric & Manufacturing Company.

Mounted on each end of the bearing housing 1, is a cap attachment 7, preferably stamped from sheet metal, and comprising a shoulder portion 8 for retaining the washer-like wiper 9, preferably made of felt, which wipes on the shaft 6. The cap is provided with a cylindrical extension 10 which is spaced from the shaft and terminates in an inwardly projecting flange 11 having an opening only slightly larger than the shaft. The inner surface of the cylindrical extension 10 is preferably provided with an absorbent lining 12 of felt or the like.

In operation, the shaft 6 of the dynamo-electric machine has a certain amount of end play, or longitudinal movement back and forth. The felt washers 9 are for the purpose of wiping the oil film which adheres to the shaft and creeps longitudinally along the same. Ordinarily the felt washers are moist with oil, and it is desirable that this should be so, in order that the washers shall remain soft and shall not become hardened, which would result in their rapid abrasion by the shaft.

The very characteristic of the oil which renders it so valuable as a lubricant, namely the tenacity with which it will maintain a film and creep along a surface on which it is deposited, becomes a detriment at the end of the bearing housing. The oil films on the moist felt washers 9 creep along the exposed surfaces, and in prior types of bearings, wherein my cylindrical extensions 10 were not utilized, the oil films would travel around the outside surfaces of the housing, where it formed a dirty paste with dust from the atmosphere, and would be carried in small quantities, by the ventilating air into the windings of the machine.

This escape of the oil was augmented by the end play of the shaft. In the prior types of bearings, as the shaft played to and fro between the bearing thrust shoulders, one of which is shown at 13, the portion of the shaft which was alternately exposed and covered by the oily felt washer, threw off small amounts of a fine oily mist, which amounted to a considerable quantity in a day's run, and the motor windings suffered in consequence.

Moreover, experience has shown that a felt washer unprotected by the overhanging flange would accumulate dirt at the exposed portion where it joined with the shaft, and this dirt would not only work its way into the housing, by reason of the end play, but it would also, in time, form a hard crust at the bearing surface of the washers, thus destroying their effectiveness.

The utility and importance of my overhanging flanges, or cylindrical extensions 10 will now be apparent. The oil films on the outer surfaces of the felt washers 9 are prevented from creeping around the outside surfaces of the housing. The oil spray, which is thrown off by the portion of the shaft which is moist with oil, as the shaft moves to and fro between the bearing thrust shoulders, is collected in the chamber formed by the cylindrical extension 10 and the inwardly bent flange 11, and it is absorbed by the absorbent coating 12 therein. The dirt and dust, instead of being deposited at the juncture of the shaft and the washer, is deposited at the juncture of the shaft and the closely fitting opening in the flange 11. The larger particles of dirt are scraped off of the shaft by the flange 11. Such particles as pass beneath the flange, by reason of the end play, are not pushed further in but are free to come right out again upon the return movement of the shaft, in the course of its end play, and hence the dirt cannot be carried into the bearing and it cannot come into contact with the felt washer where it would form a hard incrustation. It will be understood that the cylindrical extension 10 is longer than the end play of the shaft, in order that the above-described functioning should be assured.

The presence of a fine oil spray and of exposed oily surfaces is ordinarily disregarded in machinery, but in electrical machinery it has long been known that the oil attacks the winding insulation and is the cause of many breakdowns. Furthermore, if oil can leak out, dirt can enter, and the combined effects of oil leakage and dirt entrance have heretofore necessitated frequent oil renewals, as well as frequent renewals of the bushings and other wearing parts. In my improved bearing, the protection from oil loss and the protection from the entrance of dirt are so perfect that I have found it not only possible, but desirable, to omit the usual draining plug from the bottom of the oil reservoir, which is a source of oil leakage. My bearing operates so perfectly that the oil does not become dirty and does not need to be drained for very long periods of time. It has been found that oil does not need to be added except at very rare intervals of one-half year or a year or at even longer intervals.

I claim as my invention:

The combination with a rotating machine having a shaft subject to a certain amount of end play or longitudinal movement back and forth, of a bearing member for said shaft, comprising a bearing housing, and an attachment for the end of said housing comprising a cap, and a washer-like absorbent wiper carried by said cap and wiping on said shaft, the portion of said shaft engaged by said wiper as the shaft moves back and forth longitudinally in accordance with said end play being smooth, said cap having a cylindrical extension in spaced relation to said wiped portion of the shaft and terminating in an inwardly projecting flange having an opening only slightly larger than said shaft, the length of said extension beyond said wiper being at least as great as said end play.

In testimony whereof, I have hereunto subscribed my name this 25th day of May, 1926.

JOHN L. BROWN.